(12) United States Patent
Tokuyama et al.

(10) Patent No.: US 12,093,097 B2
(45) Date of Patent: Sep. 17, 2024

(54) POWER TRANSMITTING DEVICE

(71) Applicant: TOYODA GOSEI CO., LTD., Kiyosu (JP)

(72) Inventors: Yuki Tokuyama, Kiyosu (JP); Shinichiro Fuki, Kiyosu (JP); Teppei Abe, Kiyosu (JP); Tomokazu Sakai, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 0 days.

(21) Appl. No.: 18/170,594

(22) Filed: Feb. 17, 2023

(65) Prior Publication Data

US 2023/0266806 A1 Aug. 24, 2023

(30) Foreign Application Priority Data

Feb. 24, 2022 (JP) .................................. 2022-026667

(51) Int. Cl.
| | |
|---|---|
| *G06F 1/26* | (2006.01) |
| *H02J 50/20* | (2016.01) |
| *H02J 50/80* | (2016.01) |
| *H02J 50/15* | (2016.01) |
| *H02J 50/30* | (2016.01) |

(52) U.S. Cl.
CPC .............. *G06F 1/263* (2013.01); *H02J 50/20* (2016.02); *H02J 50/80* (2016.02); *H02J 50/15* (2016.02); *H02J 50/30* (2016.02)

(58) Field of Classification Search
CPC ..... G06F 1/32; G06F 1/26; G06F 9/44; G06F 1/12
See application file for complete search history.

(56) References Cited

U.S. PATENT DOCUMENTS

| | | | | |
|---|---|---|---|---|
| 6,163,706 A | * | 12/2000 | Rozenblit | ................. H03F 3/24 455/574 |
| 2008/0309452 A1 | | 12/2008 | Zeine | |
| 2010/0315045 A1 | | 12/2010 | Zeine | |

(Continued)

FOREIGN PATENT DOCUMENTS

| | | |
|---|---|---|
| JP | 5738416 B2 | 6/2015 |
| JP | 6725531 B2 | 7/2020 |
| JP | 2021-136797 A | 9/2021 |

*Primary Examiner* — Keshab R Pandey
(74) *Attorney, Agent, or Firm* — Posz Law Group, PLC (57) ABSTRACT

A power transmitting device includes a power transmitting unit configured to perform power transmission to the power receiving device through contactless power supply, and a memory unit that stores appropriate power supply information, and processing circuitry that is configured to switch a power transmission mode of the power transmitting unit. The processing circuitry is configured to acquire power supply information in a surrounding environment at execution of the power transmission, determine whether the power supply information and the appropriate power supply information are different from each other, set the power transmission mode to a limit mode when determining that the power supply information and the appropriate power supply information are different from each other, and set the power transmission mode to a normal-output mode when determining that the power supply information and the appropriate power supply information are not different from each other.

3 Claims, 4 Drawing Sheets

(56) References Cited

U.S. PATENT DOCUMENTS

| | | |
|---|---|---|
| 2012/0193999 A1 | 8/2012 | Zeine |
| 2013/0207604 A1 | 8/2013 | Zeine |
| 2014/0035524 A1 | 2/2014 | Zeine |
| 2014/0153434 A1* | 6/2014 | Kokovidis ............ H04W 48/16 370/252 |
| 2015/0022022 A1 | 1/2015 | Zeine |
| 2016/0013685 A1 | 1/2016 | Zeine |
| 2016/0127012 A1 | 5/2016 | Shylendra et al. |
| 2016/0156388 A1 | 6/2016 | Zeine et al. |
| 2016/0299210 A1 | 10/2016 | Zeine |
| 2016/0299549 A1 | 10/2016 | Zeine et al. |
| 2016/0300547 A1 | 10/2016 | El-Rukby et al. |
| 2016/0301217 A1 | 10/2016 | Zeine et al. |
| 2016/0301240 A1 | 10/2016 | Zeine et al. |
| 2016/0301243 A1 | 10/2016 | Zeine et al. |
| 2016/0301255 A1 | 10/2016 | Zeine |
| 2016/0301256 A1 | 10/2016 | Zeine et al. |
| 2016/0301258 A1 | 10/2016 | Zeine et al. |
| 2016/0301259 A1 | 10/2016 | Zeine et al. |
| 2016/0301264 A1 | 10/2016 | Zeine et al. |
| 2016/0345081 A1* | 11/2016 | Yamada ................ H04Q 9/00 |
| 2017/0041046 A1 | 2/2017 | Shylendra et al. |
| 2017/0141620 A1 | 5/2017 | Zeine et al. |
| 2017/0141621 A1 | 5/2017 | Zeine et al. |
| 2017/0187231 A1 | 6/2017 | Zeine et al. |
| 2017/0187249 A1 | 6/2017 | Zeine et al. |
| 2017/0358959 A1 | 12/2017 | Zeine |
| 2018/0255596 A1 | 9/2018 | Zeine et al. |
| 2018/0259615 A1 | 9/2018 | Zeine |
| 2018/0366085 A1 | 12/2018 | Zeine et al. |
| 2019/0020199 A1 | 1/2019 | Zeine et al. |
| 2019/0140490 A1 | 5/2019 | Zeine et al. |
| 2019/0157915 A1 | 5/2019 | Zeine et al. |
| 2019/0197984 A1 | 6/2019 | Zeine et al. |
| 2019/0199404 A1 | 6/2019 | Shylendra et al. |
| 2019/0305604 A1 | 10/2019 | Zeine et al. |
| 2019/0386521 A1 | 12/2019 | Zeine |
| 2020/0185972 A1 | 6/2020 | Zeine |
| 2020/0296780 A1 | 9/2020 | Zeine et al. |
| 2020/0303954 A1 | 9/2020 | Zeine et al. |
| 2021/0049975 A1 | 2/2021 | El-Rukby et al. |
| 2021/0063525 A1 | 3/2021 | Zeine |
| 2021/0143682 A1 | 5/2021 | Zeine |
| 2021/0249903 A1 | 8/2021 | Zeine et al. |
| 2021/0249908 A1 | 8/2021 | Zeine et al. |
| 2021/0321472 A1 | 10/2021 | Zeine et al. |
| 2021/0373117 A1 | 12/2021 | Zeine |
| 2022/0166260 A1 | 5/2022 | Zeine |

* cited by examiner

POWER TRANSMITTING DEVICE

BACKGROUND

1. Field

The present disclosure relates to a power transmitting device.

2. Description of Related Art

Japanese Patent No. 5738416 discloses a contactless power supply system that includes a power transmitting device and a power receiving device. The power transmitting device transmits power through contactless power supply. The power receiving device receives the power transmitted by the power transmitting device.

The power transmitting device in the above publication can select an optimum power supply path from among multiple power supply paths depending on whether an obstacle is present between the power transmitting device and the power receiving device. However, depending on the position of the obstacle or the type of the obstacle, an optimum power supply path cannot be selected in some cases. In such a case, the efficiency of power supply may be reduced depending on the selected power supply path.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a radiative type power transmitting device, a position of which relative to a power receiving device is fixed, is provided. The power transmitting device includes a power transmitting unit configured to perform power transmission to the power receiving device through contactless power supply, a memory unit that stores appropriate power supply information that corresponds to a case in which a surrounding environment of the power transmitting device and the power receiving device is in a steady state that is assumed in advance, and processing circuitry that is configured to switch a power transmission mode of the power transmitting unit. The power transmission mode includes a normal-output mode and a limit mode in which a transmitted power is more limited than in the normal-output mode. The processing circuitry is configured to acquire power supply information in the surrounding environment at execution of the power transmission, determine whether the power supply information and the appropriate power supply information are different from each other, set the power transmission mode to the limit mode when determining that the power supply information and the appropriate power supply information are different from each other, and set the power transmission mode to the normal-output mode when determining that the power supply information and the appropriate power supply information are not different from each other.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

A power transmitting device 31 according to one embodiment will now be described.

<Vehicle>

Figure 1:
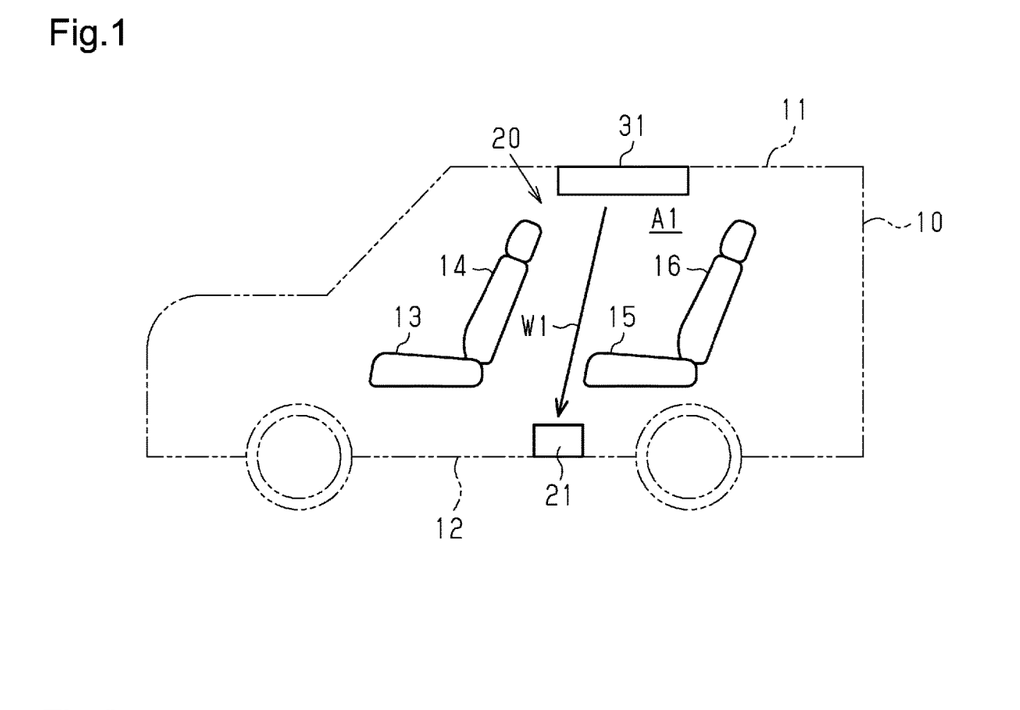
FIG. 1 is a schematic diagram of a vehicle.

As shown in FIG. 1, a vehicle 10 includes a passenger compartment A1. The passenger compartment A1 is a space that a person can enter or exit. The vehicle 10 includes a first seat 13 and a second seat 15. The first seat 13 is a frontmost seat. The first seat 13 includes a backrest 14. The backrest 14 is tiltable in a longitudinal direction of the vehicle 10. The second seat 15 is a seat arranged behind the first seat 13. The second seat 15 includes a backrest 16. The backrest 16 is tiltable in a longitudinal direction of the vehicle 10. The first seat 13 and the second seat 15 are reclining seats. The vehicle 10 includes a contactless power supply system 20.

<Contactless Power Supply System>

The contactless power supply system 20 includes a power receiving device 21 and the power transmitting device 31. The number of the power receiving device 21 may be one or more. The number of the power transmitting device 31 may be one or more. The power transmitting device 31 is of a radiative type. As the radiative type power transmitting device 31, for example, a microwave type, a laser type, or an ultrasonic type can be used. In the present embodiment, the power transmitting device 31 of a microwave type will be described as an example. The contactless power supply system 20 is a system in which the power transmitting device 31 supplies power to the power receiving devices 21 through contactless power supply using a power transfer signal W1. The power transfer signal W1 includes microwaves.

<Power Receiving Device>

Figure 2:
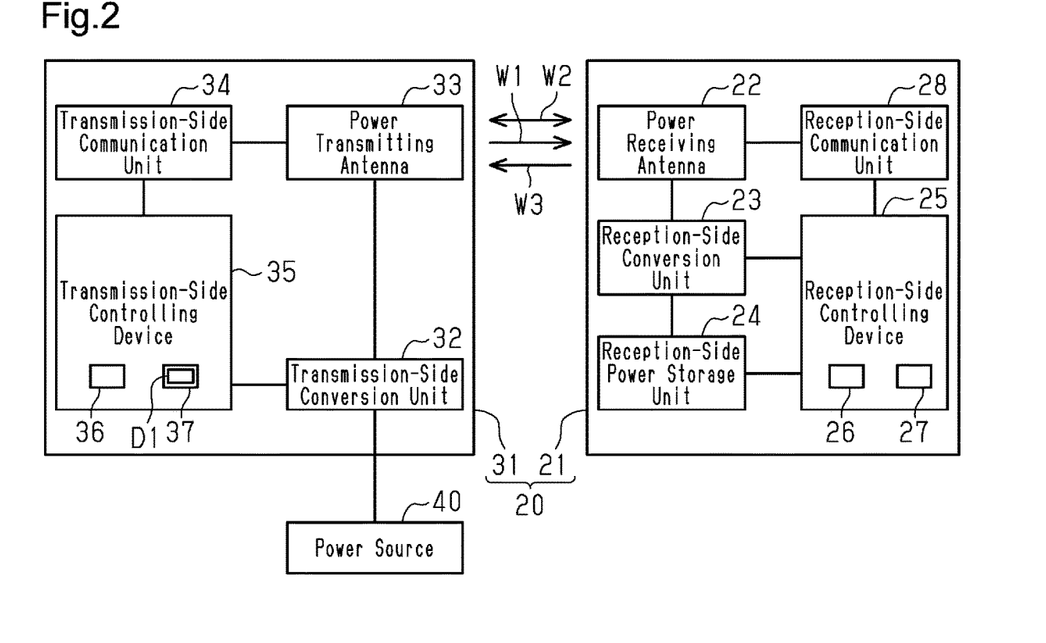
FIG. 2 is a schematic diagram of a contactless power supply system.

As shown in FIG. 2, the power receiving device 21 includes a power receiving antenna 22, a reception-side conversion unit 23, a reception-side power storage unit 24, a reception-side controlling device 25, and a reception-side communication unit 28. The power receiving device 21 is, for example, an electrical component of the vehicle 10. Examples of the power receiving device 21 include a lighting device and an audio device. The power receiving device 21 is located in the passenger compartment A1. In the example illustrated in FIG. 1, the power receiving device 21 is provided between the first seat 13 and the second seat 15 and on a bottom 12 of the vehicle 10. The power receiving device 21 may be provided in the headrest of the first seat 13, the headrest of the second seat 15, a center console, a luggage space, or a trunk compartment.

<Power Receiving Antenna>

The power receiving antenna 22 is configured to receive the power transfer signal W1. The power receiving antenna 22 may be a monopole antenna, a dipole antenna, a helical antenna, a parabolic antenna, or an antenna array including multiple antennas. The power receiving antenna 22 converts the power transfer signal W1 into AC power. The power receiving antenna 22 is configured to receive a data signal W2. The power receiving antenna 22 is configured to transmit a beacon signal W3. The power receiving antenna 22, which receives the power transfer signal W1, an antenna that transmits and receives the data signal W2, and an antenna that transmits the beacon signal W3 may be provided separately.

<Reception-Side Conversion Unit>

The reception-side conversion unit 23 converts the AC power output by the power receiving antenna 22 into received power. The received power is power that the power receiving device 21 has obtained from the power transfer signal W1. The received power is DC power. Specific configuration of the reception-side conversion unit 23 is not particularly limited, and may include, for example, a rectifier circuit and a smoothing circuit.

<Reception-Side Power Storage Unit>

The reception-side power storage unit 24 is a power source of the power receiving device 21. The reception-side power storage unit 24 may be, for example, a rechargeable battery, such as a lithium-ion storage battery and a capacitor. The reception-side power storage unit 24 stores part or all of the received power, which has been converted by the reception-side conversion unit 23. In this manner, power is received by the power receiving device 21 using the power transfer signal W1.

<Reception-Side Controlling Device>

The reception-side controlling device 25 includes a processor 26 and a memory unit 27. The memory unit 27 includes a random-access memory (RAM) and a read-only memory (ROM). The storage unit 27 stores program codes or commands configured to cause the processor 26 to execute processes. The memory unit 27, which is a computer-readable medium, includes any type of medium that is accessible by a general-purpose computer or a dedicated computer. The reception-side controlling device 25 may include a hardware circuit such as an application specific integrated circuit (ASIC) and a field programmable gate array (FPGA). The reception-side controlling device 25, which is processing circuitry, may include one or more processors that operate according to a computer program, one or more hardware circuits such as an ASIC and an FPGA, or a combination thereof.

<Reception-Side Communication Unit>

The reception-side communication unit 28 communicates with the power transmitting device 31 through transmission and reception of the data signal W2. The reception-side communication unit 28 demodulates the data signal W2 received by the power receiving antenna 22, and outputs the demodulated data signal W2 to the reception-side controlling device 25. Also, the reception-side communication unit 28 modulates the data signal W2 based on the data output by the reception-side controlling device 25 and transmits the modulated data signal W2 from the power receiving antenna 22. The mode of communication of the data signal W2 may be any mode. Examples of such a mode include modes according to communication standards such as Bluetooth (registered trademark), Wi-Fi, or ZigBee (registered trademark).

<Power Transmitting Device>

The power transmitting device 31 performs contactless power supply to the power receiving device 21 using the power transfer signal W1. The power transmitting device 31 includes a transmission-side conversion unit 32, a power transmitting antenna 33, a transmission-side communication unit 34, and a transmission-side controlling device 35. The power transmitting device 31 is located in the passenger compartment A1. The power transmitting device 31 and the power receiving device 21 are provided in the same space. The power transmitting device 31 is provided on a ceiling 11 of the vehicle 10. The relative positions of the power transmitting device 31 and the power receiving device 21 are fixed.

<Transmission-Side Conversion Unit>

The transmission-side conversion unit 32 converts power supplied from a power source 40 into an electric signal corresponding to the power transfer signal W1, and outputs the electric signal. The electric signal may be defined by any manner such as voltage, current, or power. The specific configuration of the transmission-side conversion unit 32 is not particularly limited. For example, the transmission-side conversion unit 32 includes circuitry including switching elements such as chopper circuits. Through control of the switching elements of the transmission-side conversion unit 32, the transmission-side conversion unit 32 outputs DC power supplied from the power source 40 as an electric signal of AC power. That is, the transmission-side conversion unit 32 functions as a DC/AC inverter.

<Power Source>

The power source 40 is mounted on the vehicle 10. The power source 40 may be, for example, a battery for auxiliary devices that supplies power to electrical components. If the vehicle 10 is a battery electric vehicle, the power source 40 may be the battery for traveling that supplies power to the traveling motor. The power source 40 may be a power source provided for the power transmitting device 31. The power source 40 may be a generator mounted on the vehicle 10. The power source 40 may be a combination of any of the above.

<Power Transmitting Antenna>

The power transmitting antenna 33 is configured to transmit the power transfer signal W1 to the power receiving device 21. The power transmitting antenna 33 converts the electric signal output from the transmission-side conversion unit 32 into the power transfer signal W1 and transmits the power transfer signal W1. The power transmitting antenna 33 may be a monopole antenna, a dipole antenna, a helical antenna, a parabolic antenna, or an antenna array including multiple antennas. The power transmitting antenna 33 of the present embodiment is a phased array antenna including multiple antennas. The power transmitting antenna 33 converts power output from the transmission-side conversion unit 32 into the power transfer signal W1 and wirelessly transmits the power transfer signal W1. Accordingly, the power transmitting device 31 supplies transmitted power to the power receiving device 21. The transmitted power is power transmitted as the power transfer signal W1. Also, the power transmitting antenna 33 is configured to receive the data signal W2. The power transmitting antenna 33 is configured to receive the beacon signal W3. The power transmitting antenna 33, which transmits the power transfer signal W1, an antenna that transmits and receives the data signal W2, and an antenna that receives the beacon signal W3 may be provided separately.

<Transmission-Side Communication Unit>

The transmission-side communication unit 34 communicates with the power receiving device 21 through transmission and reception of the data signal W2. The transmission-side communication unit 34 demodulates the data signal W2 received by the power transmitting antenna 33, and outputs the demodulated data signal W2 to the transmission-side controlling device 35. The transmission-side communication unit 34 modulates the data signal W2 based on the data output by the transmission-side controlling device 35 and transmits the modulated data signal W2 from the power transmitting antenna 33. Thus, the power transmitting device 31 and the power receiving device 21 are configured to communicate with each other via the data signal W2.

<Transmission-Side Controlling Device>

The transmission-side controlling device 35 is processing circuitry and includes a processor 36 and a memory unit 37. The hardware configuration of the transmission-side controlling device 35 is, for example, similar to that of the reception-side controlling device 25.

<Appropriate Power Supply Information>

The memory unit 37 stores appropriate power supply information D1. If the power transmitting device 31 includes an auxiliary memory device, the appropriate power supply information D1 may be stored in the auxiliary memory device. The auxiliary memory device may be a hard disk drive, a solid state drive, or a flash memory. In such a case, the auxiliary memory device is a memory unit that stores the appropriate power supply information D1.

The appropriate power supply information D1 is power supply information that corresponds to a case in which the surrounding environment of the power transmitting device 31 and the power receiving device 21 is in a steady state that is assumed in advance. The steady state refers to a state in which a temporarily existing obstacle is not included in the surrounding environment of the power transmitting device 31 and the power receiving device 21. The obstacle according to the present embodiment refers to an object that may be an obstacle to contactless power supply. The obstacle includes a person. For example, when a person gets into the passenger compartment A1 and is thus present between the power transmitting device 31 and the power receiving device 21, the person may temporarily obstruct the contactless power supply. In other words, power supply from the power transmitting device 31 to the power receiving device 21 is inhibited by a person. Such a state is different from the steady state. The steady state may be, for example, an ideal state in which there is no obstacle between the power transmitting device 31 and the power receiving device 21. Depending on restrictions on the arrangement of the power transmitting device 31 and the power receiving device 21, an obstacle may always be present between the power transmitting device 31 and the power receiving device 21. That is, the obstacle that is always present is included in the surrounding environment of the power transmitting device 31 and the power receiving device 21. Such a state is the steady state. The steady state is a state in which the power supply path is determined in a stable manner.

The appropriate power supply information D1 includes appropriate power supply path information and appropriate received power information.

The appropriate power supply path information indicates an appropriate power supply path, which is a power supply path in the steady state. The appropriate power supply path information is obtained by the transmission-side controlling device 35 calculating a power supply path after determining the relative positions of the power transmitting device 31 and the power receiving device 21. For example, after the relative positions of the power transmitting device 31 and the power receiving device 21 are determined, the power receiving device 21 is caused to transmit a power transmission request signal in the steady state. When receiving the power transmission request signal with the power transmitting antenna 33, the transmission-side controlling device 35 calculates a power supply path. The power supply path can be calculated based on the angle of arrival of the power transmission request signal, the phase of the power transmission request signal, and the reception strength of the power transmission request signal. When the power transmitting antenna 33 is a phased array antenna, the power transmission request signal is received by multiple antennas, and the phase of the transmission request signal varies among the antennas. The angle of arrival of the power transmission request signal can be calculated using the phases. Then, the transmission-side controlling device 35 stores, as the appropriate power supply path information, information indicating the appropriate power supply path calculated in the steady state in the memory unit 37.

The appropriate received power information indicates an appropriate received power. The appropriate received power is a power value of the received power that is obtained by the power receiving device 21 when the power transmitting device 31 transmits the power transfer signal W1 through the appropriate power supply path. The appropriate received power information is obtained by acquiring, from the power receiving device 21, the power value of the received power at the time when the power transmitting device 31 transmits the power transfer signal W1 through the appropriate power supply path. For example, after the relative positions of the power transmitting device 31 and the power receiving device 21 are determined, the power transmitting device 31 is caused to transmit the power transfer signal W1. The power receiving device 21 measures the power value of the received power obtained from the power transfer signal W1. The power receiving device 21 transmits the data signal W2 including the power value to the power transmitting device 31. The transmission-side controlling device 35 stores the information indicating the power value acquired from the data signal W2 in the memory unit 37 as the appropriate received power information.

<Control by Transmission-Side Controlling Device>

The transmission-side controlling device 35, which is processing circuitry, is capable of adjusting the transmitted power. The transmission-side controlling device 35 controls the transmitted power by controlling the power transmitting antenna 33, for example. When the power transmitting antenna 33 is a phased array antenna, the transmission-side controlling device 35 adjusts the transmitted power by adjusting the number of antennas that perform power transmission among the antennas in the phased array antenna. The transmitted power may be adjusted by controlling the transmission-side conversion unit 32 to adjust the power input to the power transmitting antenna 33. The transmission-side controlling device 35 is thus capable of adjusting the transmitted power by controlling at least one of the transmission-side conversion unit 32 and the power transmitting antenna 33. The transmission-side conversion unit 32 and the power transmitting antenna 33 are power transmitting units.

<Power Transmission Mode>

The transmission-side controlling device 35, which is processing circuitry, is capable of switching the power transmission mode of the power transmitting units. The power transmission modes include a normal-output mode and a limit mode. The normal-output mode is a mode in which the transmitted power is not limited. In the normal-output mode, for example, predetermined transmitted power is output. The magnitude of the transmitted power may change in accordance with the power input from the power source 40. The limit mode is a mode in which the transmitted power is more limited than in the normal-output mode. The limitation of the transmitted power includes a mode in which no power is transmitted. The limit mode of the present embodiment is a stop mode in which power transmission is not performed. In the stop mode, power transmission is not performed, but the operation of the transmission-side controlling device 35 is partially continued. The operation of the transmission-side controlling device 35 that is continued even during the stop mode may include, for example, transmission and reception of the data signal W2, calculation related to the direction of power transmission in which the power transfer signal W1 is transmitted, and storing of a history related to communication and calculation results in the memory unit 37. Then, the transmission-side controlling device 35 adjusts the transmitted power in accordance with the power transmission mode. Hereinafter, switching control performed in the contactless power supply system 20 to switch the power transmission mode will be described. The switching control includes a reception-side control performed by the power receiving device 21 and a transmission-side control performed by the power transmitting device 31.

<Reception-Side Control>

The reception-side control performed by the power receiving device 21 will now be described. The reception-side control is repeatedly executed at a specified control period.

Figure 3:
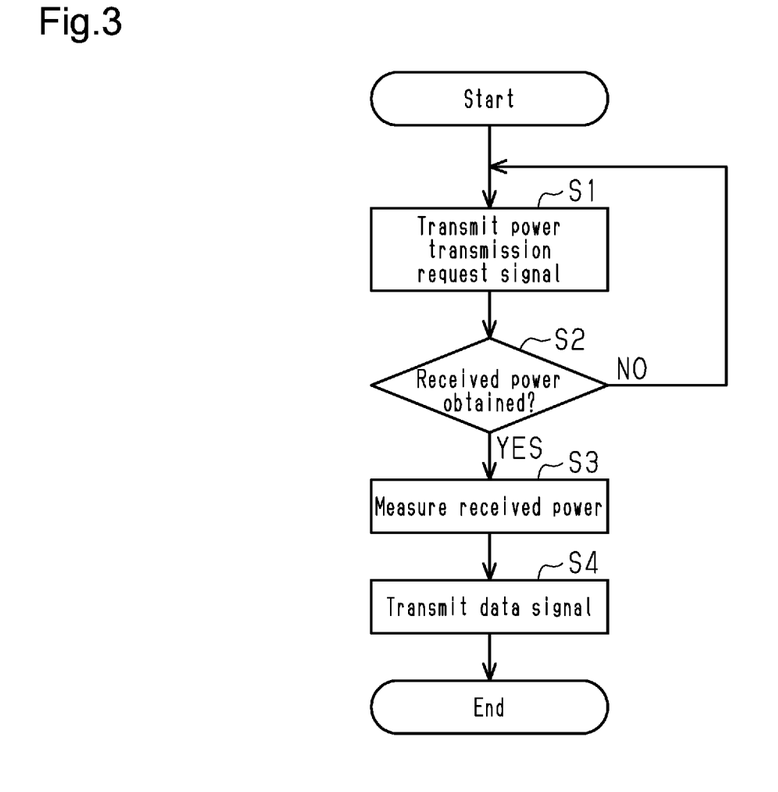
FIG. 3 is a flowchart showing a reception-side control.

As shown in FIG. 3, the reception-side controlling device 25 transmits the power transmission request signal in step S1. The power transmission request signal is transmitted as the beacon signal W3. The power transmission request signal is a signal for requesting the power transmitting device 31 to transmit power.

Subsequently, in step S2, the reception-side controlling device 25 determines whether the received power has been obtained. When the power transfer signal W1 is transmitted from the power transmitting device 31 in response to the power transmission request signal, the received power is obtained from the power transfer signal W1. The determination in step S2 can be regarded as a determination as to whether the power transmitting device 31 has transmitted the power transfer signal W1. If the determination result of step S2 is negative, the reception-side controlling device 25 returns to the process of step S1. If the determination result of step S2 is affirmative, the reception-side controlling device 25 executes the process of step S3.

In step S3, the reception-side controlling device 25 measures the received power. This allows the reception-side controlling device 25 to obtain the power value of the received power. The received power can be measured by, for example, providing a current sensor or a voltage sensor in the reception-side conversion unit 23.

Next, in step S4, the reception-side controlling device 25 transmits the data signal W2. The data signal W2 includes information indicating the power value of the received power measured in step S3. After ending the process of step S4, the reception-side controlling device 25 ends the reception-side control.

<Transmission-Side Control>

The transmission-side control performed by the power transmitting device 31 will now be described. The transmission-side control is repeatedly executed at a specified control period.

Figure 4:
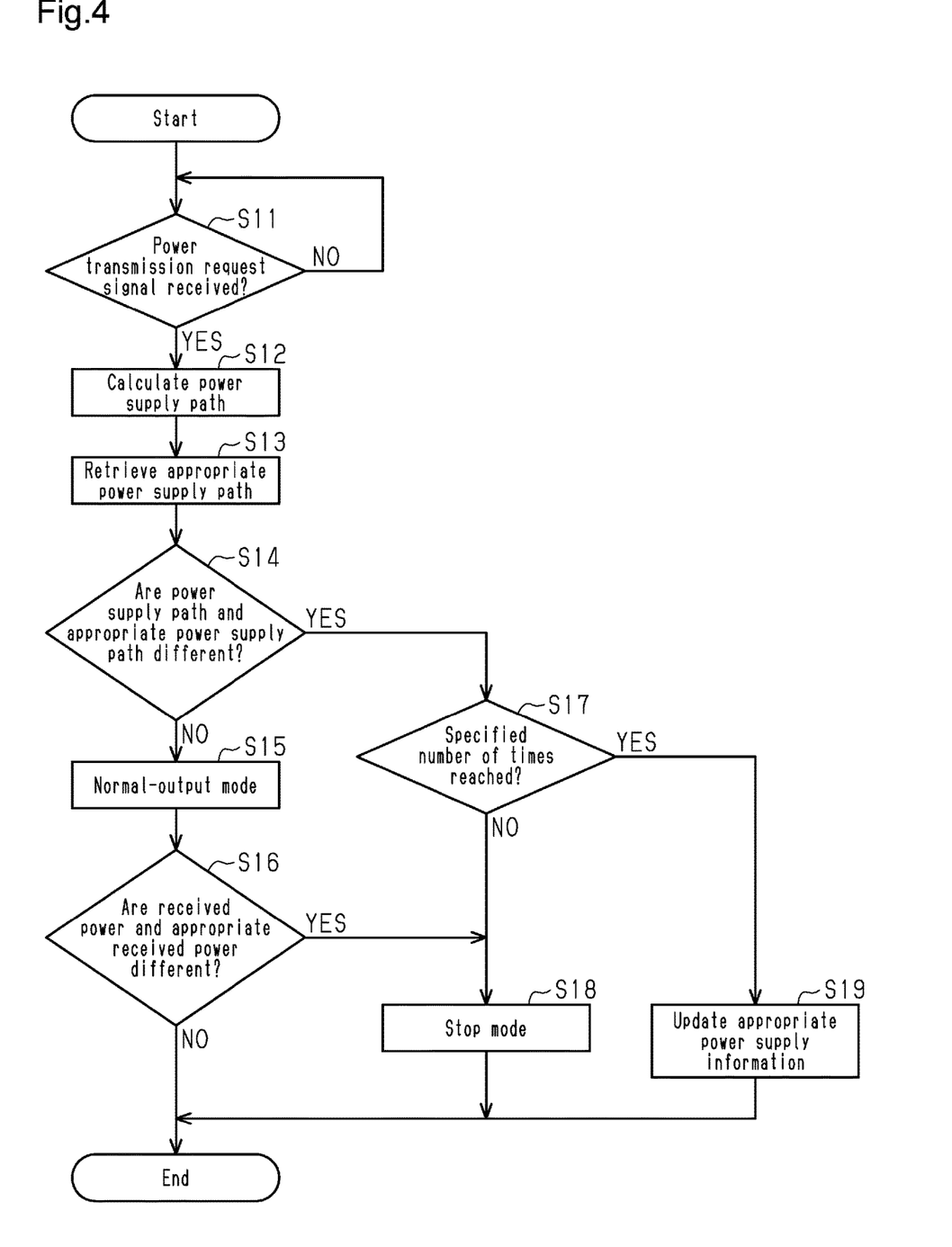
FIG. 4 is a flowchart showing a transmission-side control.

As shown in FIG. 4, in step S11, the transmission-side controlling device 35 determines whether the power transmission request signal has been received. If the determination result of step S11 is negative, the transmission-side controlling device 35 executes the process of step S11 again. If the determination result of step S11 is affirmative, the transmission-side controlling device 35 executes the process of step S12.

In step S12, the transmission-side controlling device 35 calculates a power supply path based on the power transmission request signal received in step S11. The calculation of the power supply path is performed by the same method as the calculation of the appropriate power supply path. That is, the power supply path is calculated based on the angle of arrival and the phase of the power transmission request signal received in step S11, and the received power. The power supply path calculated in step S12 is a power supply path in the surrounding environment at the time of the power transmission.

Next, in step S13, the transmission-side controlling device 35 retrieves the appropriate power supply information D1 from the memory unit 37.

Next, in step S14, the transmission-side controlling device 35 determines whether the power supply path calculated in step S12 is different from the appropriate power supply path. Specifically, the transmission-side controlling device 35 determines whether the difference between the power supply path calculated in step S12 and the appropriate power supply path is within an allowable range. The allowable range allows for slight errors due to measurement errors or the like. For example, an upper limit threshold and a lower limit threshold are set for the appropriate power supply path. The allowable range is set to range between the upper limit threshold and the lower limit threshold. The upper limit threshold is set to a value obtained by adding a specified value to the appropriate power supply path. The lower limit threshold is set to a value obtained by subtracting a specified value from the appropriate power supply path. The specified values used for setting the upper limit threshold and the lower limit threshold are set to values that allow for errors due to measurement errors or the like as described above. In addition, the specified values may be set in consideration of the angle of arrival and the phase of the power transmission request signal, and an average fluctuation of the received power. The specified values can be set within a range of, for example, 1% to 20% of the appropriate power supply path. When the difference between the power supply path and the appropriate power supply path is within the allowable range, the transmission-side controlling device 35 determines that the power supply path and the appropriate power supply path are not different from each other. When the difference between the power supply path and the appropriate power supply path is not within the allowable range, the transmission-side controlling device 35 determines that the power supply path and the appropriate power supply path are different from each other. If the determination result of step S14 is negative, the transmission-side controlling device 35 executes the process of step S15. If the determination result of step S14 is affirmative, the transmission-side controlling device 35 executes the process of step S17.

In step S15, the transmission-side controlling device 35 sets the power transmission mode to the normal-output mode. This causes the power transmitting device 31 to transmit the power transfer signal W1.

Next, in step S16, the transmission-side controlling device 35 determines whether the received power is different from the appropriate received power. When the power transfer signal W1 is transmitted in step S15, the power receiving device 21 transmits the data signal W2, which includes information indicating the power value of the received power. The transmission-side controlling device 35 determines whether the power value of the received power obtained from the data signal W2 is different from the appropriate received power. Specifically, the transmission-side controlling device 35 determines whether the difference between the power value of the received power obtained from the data signal W2 and the appropriate received power is within an allowable range. The allowable range allows for slight errors due to measurement errors or the like. When the difference between the power value of the received power and the appropriate received power is within the allowable range, the transmission-side controlling device 35 determines that the received power and the appropriate received power are not different from each other. When the difference between the power value of the received power and the appropriate received power is not within the allowable range, the transmission-side controlling device 35 determines that the received power and the appropriate received power are different from each other. If the determination result of step S16 is affirmative, the transmission-side controlling device 35 executes the process of step S18. If the determination result of step S16 is negative, the transmission-side controlling device 35 ends the transmission-side control.

In step S17, the transmission-side controlling device 35 determines whether the number of times the power supply path calculated in step S12 has been consecutively determined to be different from the appropriate power supply path has reached a specified number of times. The transmission-side controlling device 35 increments the number of times of affirmative determination results each time the determination result of step S14 is affirmative. When the determination result of step S14 is negative, the transmission-side controlling device 35 resets the number of times of affirmative determination results. When the number of times of affirmative determination results reaches the specified number of times, the transmission-side controlling device 35 determines that the number of times the power supply path calculated in step S12 has been consecutively determined to be different from the appropriate power supply path has reached the specified number of times. The specified number of times may be set to any suitable number. For example, when an obstacle is present in the surrounding environment of the power transmitting device 31 and the power receiving device 21, the specified number of times is set to a number of times with which it is determined that the elapsed time is sufficient for that object to be considered to be always present. If the determination result of step S17 is negative, the transmission-side controlling device 35 executes the process of step S18. If the determination result of step S17 is affirmative, the transmission-side controlling device 35 executes the process of step S19.

In step S18, the transmission-side controlling device 35 sets the power transmission mode to the stop mode. This causes the power transmitting device 31 to no longer transmit the power transfer signal W1.

In step S19, the transmission-side controlling device 35 updates the appropriate power supply information D1. For example, the transmission-side controlling device 35 sets the appropriate power supply path to the power supply path calculated in step S12. Then, the transmission-side controlling device 35 sets the appropriate received power to the power value of the received power obtained by the power receiving device 21 by transmitting the power transfer signal W1 through the appropriate power supply path.

<Operation>

Operation of the present embodiment will now be described.

Figure 5:
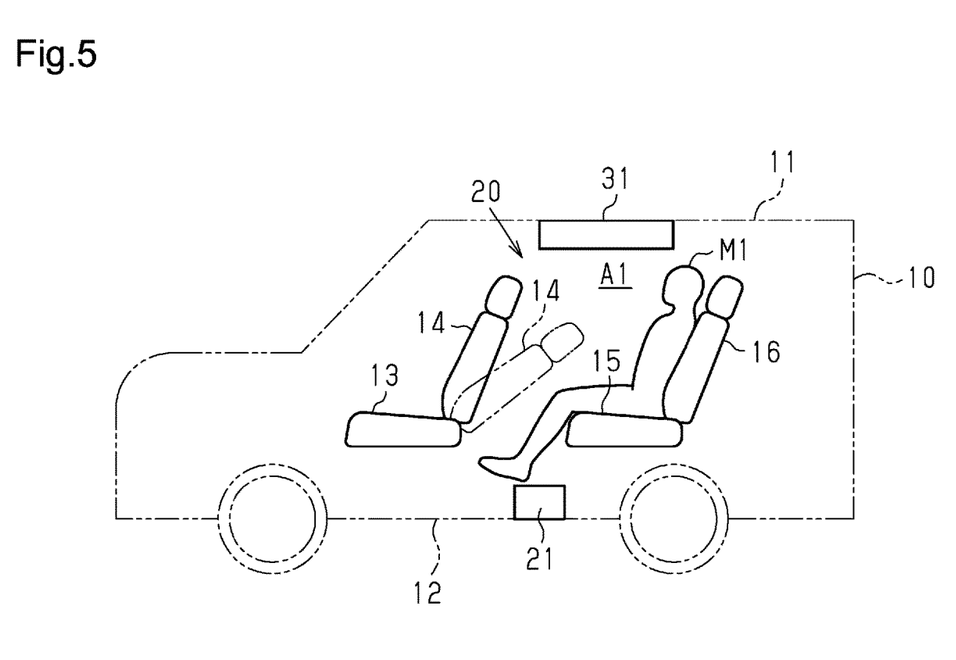
FIG. 5 is an explanatory diagram of an operation.

When the relative positions of the power receiving device 21 and the power transmitting device 31 are fixed, it is possible to acquire in advance the appropriate power supply information D1 at the time when the surrounding environment is in the steady state. When the surrounding environment of the power receiving device 21 and the power transmitting device 31 is no longer in the steady state due to the influence of an obstacle or the like, the power supply information and the appropriate power supply information D1 become different from each other. For example, when the backrest 14 of the first seat 13 is tilted rearward as shown in FIG. 5, the backrest 14 is located between the power transmitting device 31 and the power receiving device 21. This changes the power supply path and thus increases the difference between the power supply path and the appropriate power supply path. Also, the difference between the power value of the received power and the appropriate received power is increased. Similarly, when a person M1 is seated on the second seat 15, the person M1 is present between the power transmitting device 31 and the power receiving device 21. In this case, the same operation as the previous case is performed. In this manner, when the power supply information becomes different from the appropriate power supply information D1, the transmission-side controlling device 35 switches the power transmission mode to the stop mode.

<Advantages>

The present embodiment has the following advantages.

(1) When determining that the power supply information and the appropriate power supply information D1 are different from each other, the transmission-side controlling device 35, which is processing circuitry, sets the power transmission mode to the stop mode. The transmitted power is limited as compared with a case in which the power transmission mode is the normal-output mode. When power transmission cannot be performed efficiently, the transmitted power is limited. This increases the efficiency of power supply by the power transmitting device 31 to the power receiving device 21. The efficiency of supply efficiency refers to the ratio of received power to transmitted power.

(2) The power transmitting device 31 and the power receiving device 21 are provided in the same space. When the power transmitting device 31 and the power receiving device 21 are provided in different spaces, an obstacle that attenuates the power transfer signal W1 is likely to be located between the power transmitting device 31 and the power receiving device 21. For example, when the power transmitting device 31 and the power receiving device 21 are provided in different spaces, part of the walls defining the spaces or part of the vehicle 10 is located between the power transmitting device 31 and the power receiving device 21 as an obstacle. In contrast, when the power transmitting device 31 and the power receiving device 21 are provided in the same space, an obstacle is unlikely to located between the power transmitting device 31 and the power receiving device 21. The efficiency of power supply by the power transmitting device 31 to the power receiving device 21 is thus unlikely to be reduced.

(3) The power transmitting device 31 and the power receiving device 21 are provided in the same space. Since the power transfer signal W1 is transmitted to the space in which the power transmitting device 31 is provided, leakage of the power transfer signal W1 to the outside of the space in which the power transmitting device 31 is provided is limited. The present embodiment limits leakage of the power transfer signal W1 to the outside of the passenger compartment A1. As a result, it is possible to limit human exposure to electromagnetic fields due to leakage of the power transfer signal W1 to the outside of the space in which the power transmitting device 31 is provided.

(4) The transmission-side controlling device 35, which is processing circuitry, updates the appropriate power supply information D1 when the number of times the power supply path is consecutively determined to be different from the appropriate power supply path has reached the specified number of times. The steady state may change due to a change in the surrounding environment of the power receiving device 21 and the power transmitting device 31. For example, when an obstacle is always present between the power receiving device 21 and the power transmitting device 31, the presence of the obstacle is included in the steady state. The steady state is regarded to have changed when the number of times the power supply path is consecutively determined to be different from the appropriate power supply path has reached the specified number of times. The transmission-side controlling device 35 then updates the appropriate power supply information D1. Thus, even when the steady state changes, power can be transmitted from the power transmitting device 31 to the power receiving device 21.

(5) The transmission-side controlling device 35, which is processing circuitry, calculates the power supply path based on the power transmission request signal. The transmission-side controlling device 35 acquires the power value of the received power based on the data signal W2. The transmission-side controlling device 35 sets the power transmission mode to the stop mode in accordance with the power supply path and the power value of the received power. The transmission-side controlling device 35 can switch the power transmission mode to the stop mode without using sensors.

(6) When the person M1 is present between the power transmitting device 31 and the power receiving device 21, the power transmission mode is set to the stop mode. As compared to a case in which the power transmission mode is set to the normal-output mode, human exposure to electromagnetic fields due to the power transfer signal W1 is limited.

(7) Since power can be supplied to the power receiving device 21 by the power transmitting device 31, there is no need to connect the power receiving device 21 and the power source 40 by wiring. Therefore, it is not necessary to arrange wiring for connecting the power receiving device 21 and the power source 40.

(8) The power transmitting device 31 is provided on the ceiling 11. This limits leakage of the power transfer signal W1 from windows to the outside of the passenger compartment A1.

Modifications

The above-described embodiment may be modified as follows. The above-described embodiment and the following modifications can be combined as long as the combined modifications remain technically consistent with each other.

The appropriate power supply path may be the phase of the power transmission request signal or the angle of arrival of the power transmission request signal. In this case, the power supply path calculated by the transmission-side controlling device 35 from the power transmission request signal is also changed in accordance with the appropriate power supply path.

Whether to update the appropriate power supply information D1 may be determined by the user. For example, options of whether or not to update the appropriate power supply information D1 may be presented on a display unit visible to the user. The user selects whether or not to update the appropriate power supply information D1 using an input device. The display unit may be included in the vehicle 10 or may be included in a portable communication terminal carried by the user. The input device may be, for example, a touch panel or a physical button.

An additional power receiving device 21 may be provided. For example, a child safety seat including a power receiving device 21 may be newly added. In this case, the transmission-side controlling device 35 acquires the appropriate power supply information D1 of the newly added power receiving device 21. The transmission-side controlling device 35 stores the acquired the appropriate power supply information D1 into the memory unit 37. In this case, the transmission-side controlling device 35 can set the power transmission mode to the stop mode when there is a person in the child safety seat.

The transmission-side controlling device 35 may update the appropriate power supply information D1 when the number of times that the received power is consecutively determined to be different from the appropriate received power has reached a specified number of times.

The power transmitting device 31 and the power receiving device 21 may be provided in different spaces.

The transmission-side controlling device 35 does not necessarily need to update the appropriate power supply information D1. That is, the transmission-side controlling device 35 may skip the process of step S17 and step S19. In this case, if the determination result of step S14 is affirmative, the transmission-side controlling device 35 executes the process of step S18.

The comparison between the appropriate power supply information D1 and the power supply information may be performed by a sensor. As the sensor, for example, a camera can be used. The camera may be a monocular camera, a stereo camera, or a time-of-flight (ToF) camera. The camera is disposed so as to capture images of the surrounding environment of the power transmitting device 31 and the power receiving device 21. In this case, the appropriate power supply information D1 may be, for example, image data obtained from the camera in the steady state. When transmitting power, the transmission-side controlling device 35 acquires image data, which is the power supply information, from the camera. The transmission-side controlling device 35 may compare the image data with image data obtained from the camera in the steady state. The comparison of the image data is performed by, for example, comparing feature points based on the luminance information. When an obstacle is present between the power transmitting device 31 and the power receiving device 21, a change occurs from the image data serving as the appropriate power supply information D1. This allows the transmission-side controlling device 35 to calculate the difference between the appropriate power supply information D1 and the power supply information through comparison of the image data. The appropriate power supply information D1 may be coordinate data of a nearby object in the steady state. The coordinate data of a nearby object in the steady state can be calculated using the image data acquired from the camera in the steady state. When transmitting power, the transmission-side controlling device 35 acquires image data from the camera. The transmission-side controlling device 35 calculates the coordinate data from the image data. When an obstacle is present between the power transmitting device 31 and the power receiving device 21, coordinate data due to the obstacle is generated. This allows the transmission-side controlling device 35 to calculate the difference between the appropriate power supply information D1 and the power supply information through comparison of the coordinate data.

As the sensor, a living body detection sensor, an ultrasonic sensor, or the like may be used. In this case, the transmission-side controlling device 35 may set the power transmission mode to the stop mode when a living body or an obstacle is present between the power transmitting device 31 and the power receiving device 21.

The power receiving device 21 does not necessarily need to transmit the power transmission request signal. The memory unit 37 of the transmission-side controlling device 35 stores the appropriate power supply path. Therefore, the power transmitting device 31 can transmit the power transfer signal W1 using the appropriate power supply path without calculating the power supply path from the power transmission request signal.

The power transmitting device 31 may transmit an activation request signal to the power receiving device 21. The activation request signal is a signal for requesting activation of the power receiving device 21 when the power receiving device 21 is in the sleep state. The sleep state of the power receiving device 21 is a state in which some of the functions of the power receiving device 21 are restricted. Even when the power receiving device 21 is in the sleep state, the power receiving device 21 transmits the data signal W2. The transmission-side controlling device 35 sets the power transmission mode to the stop mode when the power transmitting device 31 does not receive the data signal W2 in response to the activation request signal or the power transmission request signal.

The power transmitting device 31 may transmit a power transmission test signal to the power receiving device 21. The power transmission test signal is a signal for requesting activation of the power receiving device 21 when the power receiving device 21 is in a stopped state. The stopped state of the power receiving device 21 is a state in which more functions of the power receiving device 21 are restricted than in the sleep state. When the power receiving device 21 is in the stopped state, the power receiving device 21 does not transmit the data signal W2. The transmission-side controlling device 35 sets the power transmission mode to the stop mode when the power transmitting device 31 does not receive the data signal W2 in response to the power transmission test signal.

The data signal W2 transmitted from the power receiving device 21 and the power transmission request signal may include identification information. The identification information is an ID code unique to the power receiving device 21. In this case, the power transmitting device 31 may transmit power only to the power receiving device 21 having identification information authenticated in advance. When the contactless power supply system 20 includes multiple power receiving devices 21, the appropriate power supply information D1 can be stored in the memory unit 37 for each power receiving device 21 in association with the identification information. Then, the transmission-side controlling device 35 can compare the appropriate power supply information D1 with the power supply information for each power receiving device 21.

The appropriate power supply information D1 may be one of the appropriate power supply path information and the appropriate received power information. If the appropriate power supply information D1 includes only the appropriate power supply path information, the determination of step S16 does not necessarily need to be performed. If the appropriate power supply information D1 includes only the appropriate received power information, the determination of step S14 does not necessarily need to be performed.

The contactless power supply system 20 may be used in a building such as a factory, a home, a commercial facility, or a public facility. In this case, the power source 40 may be a system power source or a power generator such as a solar photovoltaic power generator.

The limit mode may be a low-output mode. The low-output mode is a power transmission mode in which power lower than that in the normal-output mode is transmitted. The low-output mode may be a mode in which the power value of the transmitted power is lower than that in the normal-output mode. The low-output mode may be a mode in which the power transfer signal W1 is transmitted less frequently than in the normal-output mode.

The space in which the power transmitting device 31 and the power receiving device 21 are provided may be a space in which entry of third parties is restricted. If the power transmitting device 31 and the power receiving device 21 are provided in the same space, leakage of the power transfer signal W1 to the outside of the space in which the power transmitting device 31 is provided is limited. Even when an unintended power receiving device 21 is installed outside the space, that power receiving device 21 is prevented from receiving power.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A radiative type power transmitting device, a position of which relative to a power receiving device is fixed, the power transmitting device, comprising:
   a power transmitting antenna configured to perform power transmission to the power receiving device through contactless power supply;
   a memory unit that stores appropriate power supply information that corresponds to a case in which a surrounding environment of the power transmitting device and the power receiving device is in a steady state that is assumed in advance; and processing circuitry that is configured to switch a power transmission mode of the power transmitting antenna, wherein the power transmission mode includes a normal-output mode and a limit mode in which a transmitted power is more limited than in the normal-output mode, and the processing circuitry is configured to
- acquire power supply information in the surrounding environment at execution of the power transmission,
- determine whether the power supply information and the appropriate power supply information are different from each other,
- set the power transmission mode to the limit mode when determining that the power supply information and the appropriate power supply information are different from each other, and
- set the power transmission mode to the normal-output mode when determining that the power supply information and the appropriate power supply information are not different from each other.

2. The power transmitting device according to claim 1, wherein the power transmitting device is provided in a same space as the power receiving device.

3. The power transmitting device according to claim 1, wherein the processing circuitry is configured to update the appropriate power supply information when a number of times the power supply information and the appropriate power supply information are consecutively determined to be different from each other has reached a specified number of times.

* * * * *